(12) United States Patent
Potucek et al.

(10) Patent No.: US 10,985,612 B2
(45) Date of Patent: Apr. 20, 2021

(54) POWER SUPPLIES FOR POOL AND SPA EQUIPMENT

(71) Applicant: Hayward Industries, Inc., Berkeley Heights, NJ (US)

(72) Inventors: Kevin L. Potucek, Far Hills, NJ (US); Dennis Willis, Oak Ridge, NC (US); Jirawat (Jeffrey) Sumonthee, West Palm Beach, FL (US); Benoit J. Renaud, Fort Atkinson, WI (US); Douglas H. Philhower, Henderson, NV (US); Patrick J. Forsythe, Oconomowoc, WI (US); William M. Normyle, Yadkinville, NC (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 0 days.

(21) Appl. No.: 17/020,488

(22) Filed: Sep. 14, 2020

(65) Prior Publication Data
US 2020/0412168 A1    Dec. 31, 2020

Related U.S. Application Data

(63) Continuation of application No. 16/538,522, filed on Aug. 12, 2019, now abandoned, which is a (Continued)

(51) Int. Cl.
*E04H 4/16* (2006.01)
*C02F 1/00* (2006.01)
(Continued)

(52) U.S. Cl.
CPC .............. *H02J 50/10* (2016.02); *C02F 1/001* (2013.01); *E04H 4/1654* (2013.01);
(Continued)

(58) Field of Classification Search
CPC combination set(s) only.
See application file for complete search history.

(56) References Cited

U.S. PATENT DOCUMENTS

| 3,549,990 A | 12/1970 | Hochheiser |
| 3,995,209 A | 11/1976 | Weston |

(Continued)

FOREIGN PATENT DOCUMENTS

| CN | 101725263 A | 6/2010 |
| EP | 1122382 A1 | 8/2001 |

(Continued)

OTHER PUBLICATIONS

International Search Report dated Jun. 4, 2012, issued in connection with International Application No. PCT/US2011/064248 (5 pages).

(Continued)

*Primary Examiner* — Christopher P Domone
(74) *Attorney, Agent, or Firm* — McCarter & English, LLP

(57) ABSTRACT

Power supplies for pool and spa equipment are disclosed. In one embodiment, the power supply includes a buoyant housing, a peripheral float, at least one solar cell positioned on the buoyant housing for collecting sunlight and converting same to electrical energy, and a power cable for interconnecting the power supply and pool/spa equipment. In other embodiments, first and second inductive power couplings are provided for powering pool and spa equipment. The power couplings can also be installed using existing plumbing features of the pool or spa.

20 Claims, 17 Drawing Sheets

Related U.S. Application Data continuation of application No. 15/359,016, filed on Nov. 22, 2016, now Pat. No. 10,381,872, which is a continuation of application No. 13/316,161, filed on Dec. 9, 2011, now Pat. No. 9,502,907.

(60) Provisional application No. 61/421,912, filed on Dec. 10, 2010.

(51) Int. Cl.

| | | |
|---|---|---|
| *H02J 50/10* | (2016.01) | |
| *H01F 38/14* | (2006.01) | |
| *H02J 7/02* | (2016.01) | |
| *H02J 50/20* | (2016.01) | |
| *H02J 7/35* | (2006.01) | |
| *C02F 103/42* | (2006.01) | |

(52) U.S. Cl.
CPC ........... *E04H 4/1672* (2013.01); *H01F 38/14* (2013.01); *H02J 7/025* (2013.01); *H02J 7/35* (2013.01); *H02J 50/20* (2016.02); *C02F 2103/42* (2013.01)

(56) References Cited

U.S. PATENT DOCUMENTS

| | | | |
|---|---|---|---|
| 4,404,559 | A | 9/1983 | Renner |
| 4,654,573 | A | 3/1987 | Rough et al. |
| 4,838,797 | A | 6/1989 | Dodier |
| 5,106,492 | A | 4/1992 | Distinti et al. |
| 5,422,519 | A | 6/1995 | Russell |
| 6,294,084 | B1 | 9/2001 | Henkin et al. |
| 6,485,638 | B2 | 11/2002 | Henkin et al. |
| 6,652,742 | B2 | 11/2003 | Henkin et al. |
| 6,842,931 | B2 | 1/2005 | Porat et al. |
| 7,101,475 | B1 | 9/2006 | Maaske et al. |
| 9,502,907 | B2 | 11/2016 | Potucek et al. |
| 10,381,872 | B2 | 8/2019 | Potucek et al. |
| 2001/0032809 | A1 | 10/2001 | Henkin et al. |
| 2004/0092181 | A1* | 5/2004 | Porat .............. B63B 22/24 441/136 |
| 2004/0168299 | A1* | 9/2004 | Porat .............. E04H 4/1654 29/596 |
| 2005/0234595 | A1 | 10/2005 | Tani |
| 2005/0253555 | A1 | 11/2005 | Lee et al. |
| 2006/0101567 | A1* | 5/2006 | Hutchings .............. A61H 33/60 4/496 |
| 2007/0032809 | A1 | 2/2007 | Griego et al. |
| 2007/0067930 | A1 | 3/2007 | Garti |
| 2007/0151914 | A1 | 7/2007 | Riley |
| 2007/0247838 | A1 | 10/2007 | Fan |
| 2008/0060984 | A1 | 3/2008 | Henkin et al. |
| 2010/0252560 | A1 | 10/2010 | Churchill |
| 2011/0247970 | A1 | 10/2011 | Evingham |
| 2013/0321223 | A1 | 12/2013 | Bokenfohr et al. |
| 2017/0073990 | A1 | 3/2017 | Potucek et al. |
| 2017/0073991 | A1 | 3/2017 | Potucek et al. |
| 2018/0142487 | A1 | 5/2018 | Durvasula et al. |

FOREIGN PATENT DOCUMENTS

| | | | |
|---|---|---|---|
| EP | 1454885 | A2 | 9/2004 |
| EP | 1147758 | B1 | 1/2006 |
| EP | 1657798 | A1 | 5/2006 |
| EP | 1760564 | A2 | 3/2007 |
| EP | 1785552 | A2 | 5/2007 |
| FR | 2998104 | A1 | 5/2014 |
| WO | 2009/047768 | A2 | 4/2009 |

OTHER PUBLICATIONS

Written Opinion of the International Searching Authority dated Jun. 4, 2012, issued in connection with International Application No. PCT/US2011/064248 (10 pages).
Office Action (Restriction Requirement) dated Feb. 11, 2014, issued in connection with U.S. Appl. No. 13/316,161 (4 pages).
Office Action dated Aug. 12, 2014, issued in connection with U.S. Appl. No. 13/316,161 (13 pages).
Interview Summary dated Jan. 9, 2015, issued in connection with U.S. Appl. No. 13/316,161 (3 pages).
Chinese Office Action dated Feb. 17, 2015, issued in connection with Chinese Application No. 201180066389.4, along with English translation thereof (7 pages).
Office Action dated Jun. 17, 2015, issued in connection with U.S. Appl. No. 13/316,161 (16 pages).
Partial Supplementary European Search Report dated Jun. 18, 2015, issued in connection with European Patent Application No. 11847650.6 (6 pages).
Extended Supplementary European Search Report dated Sep. 28, 2015, issued in connection with European Patent Application No. 11847650.6 (11 pages).
Chinese Office Action dated Dec. 28, 2015, issued in connection with Chinese Application No. 201180066389.4, along with English translation thereof (13 pages).
First Examination Report dated Mar. 3, 2016, issued in connection with Australian Patent Application No. 2011338154 (3 pages).
Notice of Allowance dated Apr. 21, 2016, issued in connection with U.S. Appl. No. 13/316,161 (6 pages).
Notice of Allowance dated Jul. 13, 2016, issued in connection with U.S. Appl. No. 13/316,161 (6 pages).
European Office Action dated Jul. 19, 2016, issued in connection with European Application No. 11847650.6 (5 pages).
Israeli Office Action dated Jul. 27, 2016, issued in connection with Israeli Patent Application No. 226860, along with English translation thereof (5 pages).
European Office Action dated Jun. 16, 2017, issued in connection with European Application No. 11847650.6 (3 pages).
Canadian Office Action dated Jul. 6, 2017, issued in connection with Canadian Patent Application No. 2,820,961 (3 pages).
First Examination Report dated Aug. 3, 2017, issued in connection with Australian Patent Application No. 2016225912 (3 pages).
Office Action dated Nov. 8, 2017, issued in connection with U.S. Appl. No. 15/359,016 (13 pages).
European Office Action dated Mar. 21, 2018, issued in connection with European Application No. 11847650.6 (3 pages).
Chinese Office Action dated Jun. 26, 2018, issued in connection with Chinese Application No. 201610844282.2, and English translation thereof (18 pages).
Office Action dated Aug. 21, 2018, issued in connection with U.S. Appl. No. 15/359,016 (14 pages).
Canadian Office Action dated Aug. 24, 2018, issued in connection with Canadian Application No. 2,820,961 (6 pages).
Office Action dated Sep. 28, 2018, issued in connection with U.S. Appl. No. 15/359,046 (10 pages).
Communication under Rule 71(3) EPC (Intention to Grant) dated Feb. 4, 2019, issued by the European Patent Office in connection with European Application No. 11847650.6 (5 pages).
Israeli Office Action dated Feb. 21, 2019, issued in connection with Israeli Patent Application No. 254175, and English translation thereof (8 pages).
Notice of Allowance, including Examiner-Initiated Interview Summary, dated Apr. 25, 2019, issued in connection with U.S. Appl. No. 15/359,016 (13 pages).
Chinese Office Action dated May 8, 2019, issued in connection with Chinese Application No. 201610844282.2, and English translation thereof (15 pages).
Canadian Office Action dated May 16, 2019, issued in connection with Canadian Patent Application No. 2,820,961 (4 pages).
First Examination Report dated Jun. 22, 2019, issued by the Australian Patent Office in connection with Australian Patent Application No. 2018211302 (3 pages).

(56) References Cited

OTHER PUBLICATIONS

International Search Report and Written Opinion of the International Searching Authority, dated Sep. 18, 2019, issued in connection with International Application No. PCT/US2019/038121 (9 pages).
Extended European Search Report dated Nov. 4, 2019, issued in connection with European Patent Application No. 19191326.8 (9 pages).
Chinese Office Action dated Jan. 17, 2020, issued in connection with Chinese Application No. 201610844282.2, and English translation thereof (14 pages).
Office Action dated Mar. 13, 2020, issued in connection with U.S. Appl. No. 16/538,522 (7 pages).
Chinese Office Action dated Jul. 29, 2020, issued in connection with Chinese Application No. 201610844282.2, and machine-generated English translation thereof (17 pages).
Office Action dated Oct. 13, 2020, issued by the Israeli Patent Office in connection with Israeli Patent Application No. 254175 (6 pages, including English-language translation).
Examination Report dated Feb. 10, 2021, issued by the Australian Intellectual Property Office in connection with Australian Patent Application No. 2020202030 (8 pages).
Examination Report dated Feb. 22, 2021, issued by the European Patent Office in connection with European Patent Application No. 19191326.8 (3 pages).

* cited by examiner

POWER SUPPLIES FOR POOL AND SPA EQUIPMENT

RELATED APPLICATIONS

This application is a continuation application of U.S. patent application Ser. No. 16/538,522 filed on Aug. 12, 2019, which is a continuation application of U.S. patent application Ser. No. 15/359,016 filed on Nov. 22, 2016 (issued as U.S. Pat. No. 10,381,872), which is a continuation application of U.S. patent application Ser. No. 13/316,161 filed on Dec. 9, 2011 (issued as U.S. Pat. No. 9,502,907), which claims the benefit of priority to U.S. Provisional Application Ser. No. 61/421,912 filed on Dec. 10, 2010, the disclosures of all of which are expressly incorporated herein by reference in their entirety.

BACKGROUND

Field of the Invention

The present invention relates to power supplies, and specifically, power supplies for pool and spa equipment.

Related Art

Various types of equipment are available for pools and spas. Often, such equipment is powered electrically. One example is a pool cleaner, which automatically cleans the underwater surfaces of a pool or spa. Such a device can be powered hydraulically (e.g., by a hose connected to the return line of a pool or spa filter and pump), or electrically. Also, such a device can float to the surface of pool/spa water, for cleaning same.

In the case of an electrically-powered underwater pool cleaner, electrical power is delivered to the cleaner by a low-voltage cable connected between the pool cleaner and a power supply external to the pool or spa. Because the power supply is located external to the pool or spa, it is necessary for the cable connecting the pool cleaner and the power supply to extend out of the pool and, often, across a peripheral concrete walkway surrounding most pools. This can be unsightly.

Self-contained, battery-powered, underwater pool cleaners do exist, and obviate the need for an external power supply and a cable interconnecting the pool cleaner with an external power supply. However, only a limited amount of power is available to the pool cleaner, due to the limited capacity of the cleaner's on-board battery. As a result, the pool cleaner must be periodically recharged, which often requires removing the pool cleaner from the pool before each recharging.

SUMMARY

The present invention relates to power supplies for pool and spa equipment. In one embodiment, the power supply includes a buoyant housing, a peripheral float, at least one photovoltaic (solar) cell positioned on the buoyant housing for collecting sunlight and converting same to electrical energy, and a power cable for interconnecting the power supply and pool/spa equipment (e.g., an underwater pool cleaner) and for transmitting electrical energy generated by the solar cells to the equipment to power same. Optionally, the power supply could include one or more rechargeable batteries for storing electrical energy generated by the solar cells and powering the pool/spa equipment during periods of low or no sunlight.

In another embodiment, the present invention provides inductive power couplings positioned in the walls or floor of a pool or spa, for providing power to an underwater device (such as an underwater cleaner). The inductive power coupling in the wall or floor includes an inductor circuit powered by an associated power supply unit. An underwater device (e.g., a pool cleaner) could be connected to a complementary inductive power coupling which includes an inductor circuit. The complementary inductive power coupling of the underwater device can be inserted into the inductive power coupling of the pool/spa. Mating of the inductive power couplings allows energy to be wirelessly transferred from the first inductor circuit to the second inductor circuit through an electromagnetic field, to supply the underwater device with electrical power. Optionally, the inductive power couplings could be shaped as flat couplings, and/or they could include magnets located on the peripheries of the couplings for magnetically coupling the components.

In another embodiment, the present invention provides an inductive element, e.g., conduit or cable, which could be buried within a pool or spa floor or wall. This creates an electromagnetic field surrounding the inductive element, for wirelessly transmitting energy to an inductive circuit on-board an underwater device (e.g., to an underwater cleaner operated along the pool or spa floor or wall).

In another embodiment, the present invention provides inductive power couplings that can be installed in an existing plumbing fixture of a pool or a spa, for providing power to a pool or spa device (such as a cleaner). For example, the power coupling can be installed (retrofitted) into an existing suction outlet (and associated pipe) in a pool or a spa, to provide electrical power via such an outlet. An underwater device (e.g., a pool cleaner) could be connected to a complementary inductive power coupling which includes an inductor circuit. The complementary inductive power coupling of the underwater device can be inserted into the suction outlet and coupled with the inductive power coupling installed in the suction outlet.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present invention relates to power supplies for pool and spa equipment, as discussed in detail below in connection with FIGS. 1-17.

Figure 1:
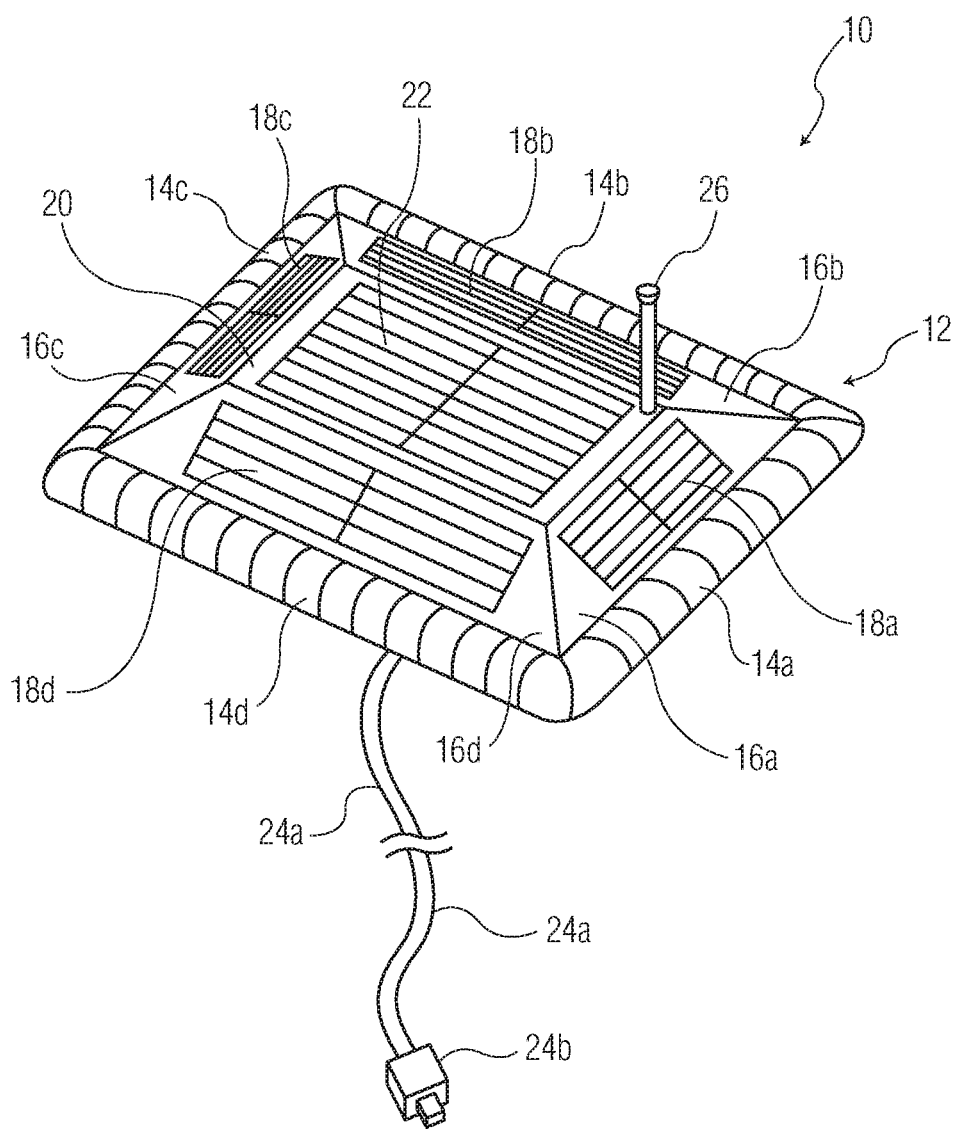
FIGS. 1-2 are perspective and top views, respectively, of the floating power supply of the present invention.
Figure 2:
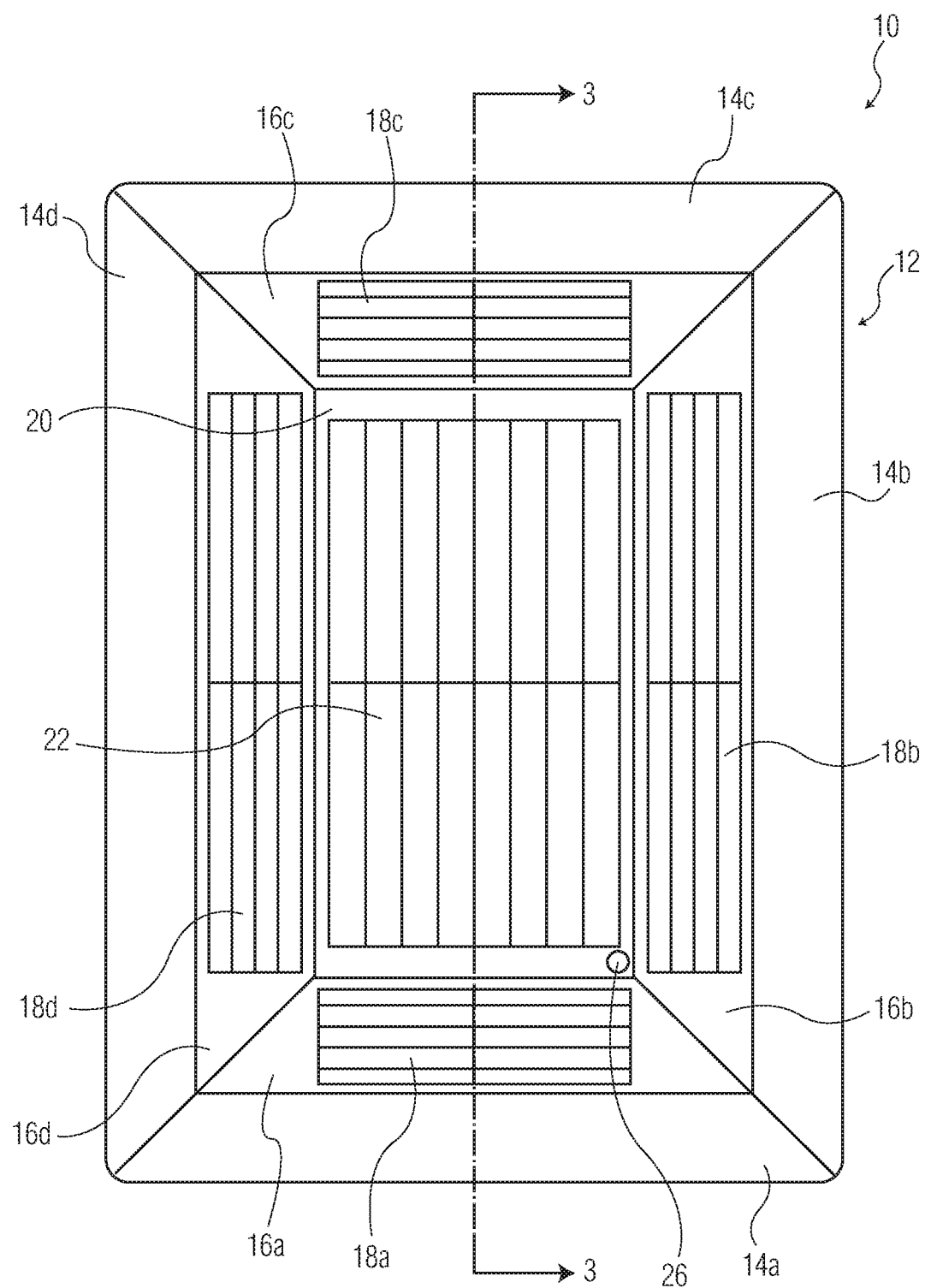

FIGS. 1-2 are perspective and top views, respectively, of the floating power supply 10 of the present invention. The power supply 10 includes a buoyant housing 12, a power cord 24a connected to the buoyant housing 12, an optional radio frequency antenna 26 for allowing wireless communication with a device connected to the power supply 10, and a coupling 24b for connection with pool or spa equipment, such as an underwater pool cleaner. The buoyant housing 12 includes peripheral float sections 14a-14d, angled walls 16a-16d, angled photovoltaic (solar) cells 18a-18d on the angled surfaces 16a-16d, and a top wall 20 containing a top solar cell 22. The housing 12 is waterproof, floats in pool or spa water, and generates electrical power from sunlight for powering pool or spa equipment connected to the coupling 24b. The cord 24a delivers such power from the buoyant housing 12 to the pool or spa equipment. The antenna 26 could allow for wireless communication with a handheld device and/or central pool/spa control system, as well as a home LAN, while avoiding issues related to transmitting radio frequencies underwater. Advantageously, the solar cells 18a-18d and 22 are positioned so as to maximize exposure to sunlight when the housing 12 is floating in a pool or spa. It is noted that the shape of the housing 12 could be varied, as well as the number and positioning of the solar cells 18a-18d and 22, without departing from the spirit or scope of the present invention.

Figure 3:
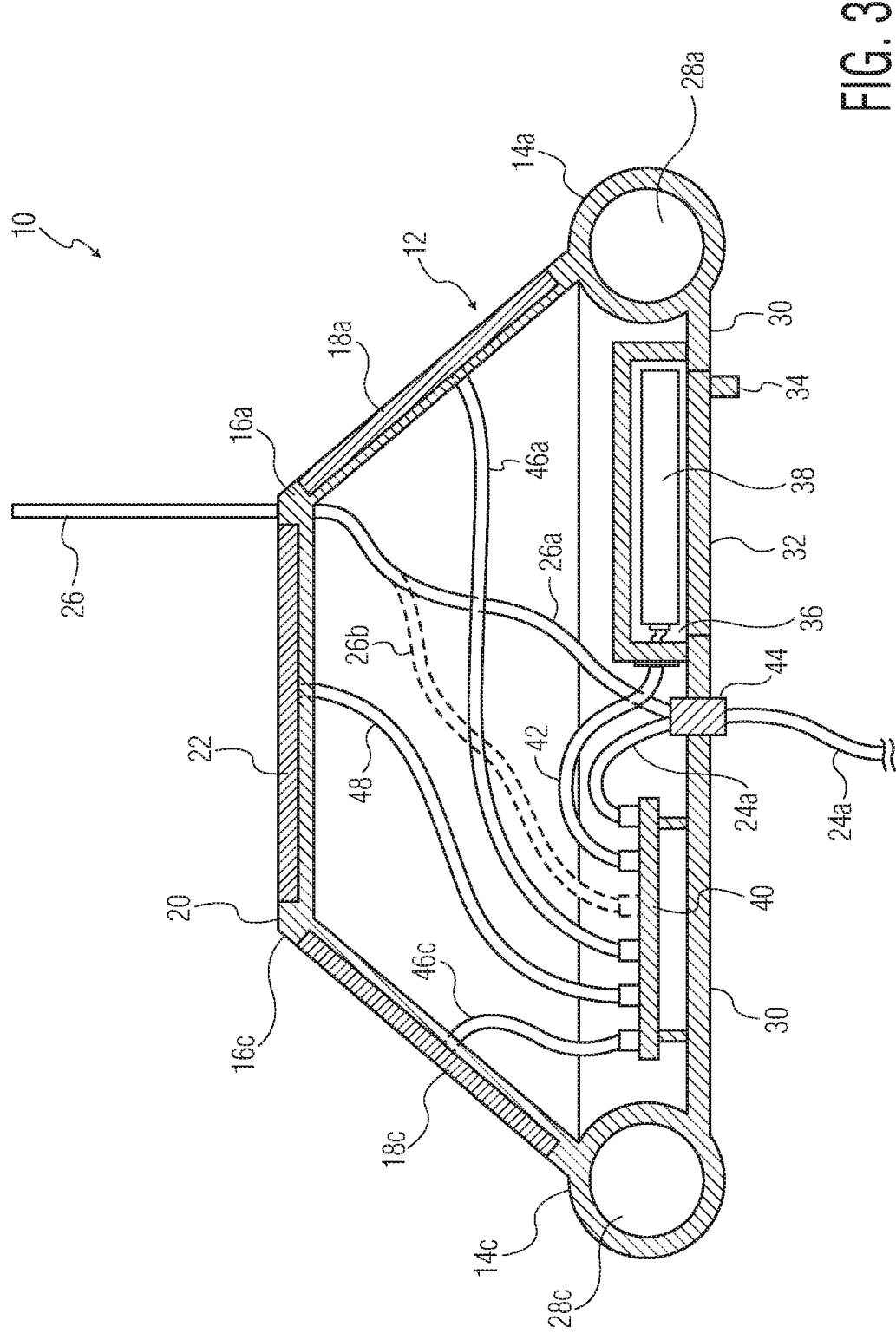
FIG. 3 is a cross-sectional view taken along the line 3-3 of FIG. 2, showing construction of the floating power supply of the present invention in greater detail.

FIG. 3 is a cross-sectional view taken along the line 3-3 of FIG. 2, showing construction of the power supply 10 of the present invention in greater detail. As can be seen, the solar cells 18a, 18c, and 22 are mounted in corresponding recesses formed in the walls 16a, 16c, and 20. The solar cells 18b and 18d (not shown in FIG. 3) are also mounted in corresponding recesses formed in the walls 16b and 16d. The solar cells 18a-18d and 22 are waterproof, so as to withstand exposure to pool/spa water, as well as rain, without sustaining damage. The solar cells 18a-18d and 22 are connected via wires 46a, 46c and 48 to a printed circuit board 40 attached to a bottom wall 30 of the housing 12. Similarly, antenna 26 could be mounted to the top surface 20 to facilitate the transmission of radio frequencies to the floating power supply 10 and underwater cleaner. The antenna 26 is connected directly to the underwater device (e.g., cleaner) via cord 26a extending through grommet 44. In an alternative embodiment, the antenna 26 is connected to printed circuit board 40 by cord 26b (e.g., to allow for wireless communications with the printed circuit board 40). The printed circuit board 40 includes circuitry, discussed below, for delivering power to pool/spa equipment and for charging an optional on-board battery 38 connected to the printed circuit board 40 via cable 42. Such a battery 38, if provided, could be housed within a battery compartment 36 formed in the housing 12 and having a removable, waterproof door 32 (and associated handle 34). The door 32 could be removable from the housing 12, or pivotally connected thereto by way of a hinge. Advantageously, the battery 38 could provide power to pool/spa equipment when the power supply 10 is not exposed to sunlight, and the battery 38 could be charged by the solar cells 18a-18d and 22 when the power supply 10 is exposed to sunlight. This allows the power supply 10 to continue to deliver power to pool/spa equipment in periods of low or no sunlight. The printed circuit board 40 is also connected to the power cord 24a, for connection to pool/spa equipment. The grommet 44 ensures that a watertight seal is formed between the power cord 24a, the cord 26a, and the housing 12.

The peripheral floats 14a, 14c include inner chambers 28a, 28c which are filled with air. The floats 14b, 14d (not shown in FIG. 3) also include similar air-filled inner chambers. It is noted that the housing 12 could be constructed from a suitable, high-impact plastic material (e.g., ABS plastic), or any other equivalent. Preferably, such material is resistant to damage from ultraviolet light present in sunlight, and is lightweight. The floats 14a-14d could be formed integrally with the walls 16a-16d and 30. In alternate embodiments, the floats 14a-14d may be formed of a material that is inherently buoyant, such as plastic foams, e.g., polyvinyl chloride and polyethylene. Also, the entire housing 12 could be manufactured using any suitable manufacturing process, including, but not limited to, injection molding.

Figure 4:
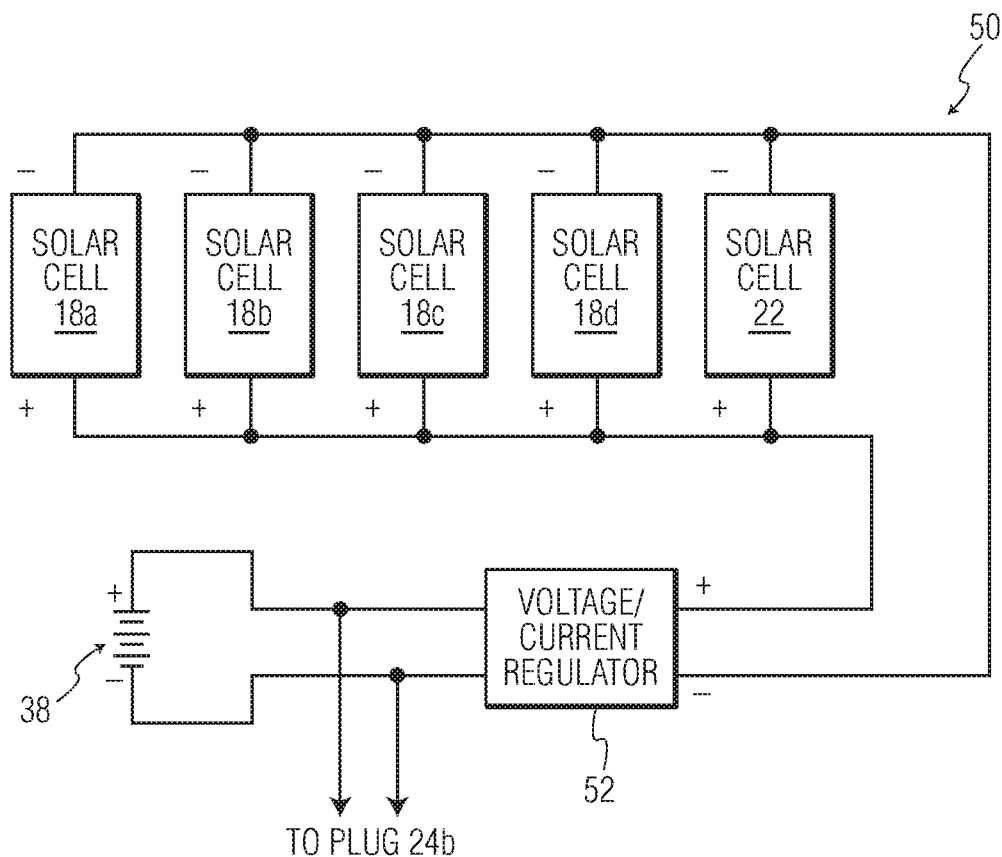
FIG. 4 is a schematic diagram showing circuitry of the floating power supply of the present invention.

FIG. 4 is a schematic diagram, indicated generally at 50, showing circuitry of the power supply 10 of the present invention. The solar cells 18a-18d and 22 are connected in parallel to a voltage or current regulator integrated circuit (IC) 52, which ensures proper delivery of electrical charge to the battery 38. The battery 38 could include a rechargeable nickel cadmium, nickel metal hydride, lithium ion, lithium polymer, sealed lead acid, or any other suitable rechargeable battery. Power from the battery 38, or from the solar cells 18a-18d and 22, is provided to pool/spa equipment connected to the coupling 24b.

Figure 5:
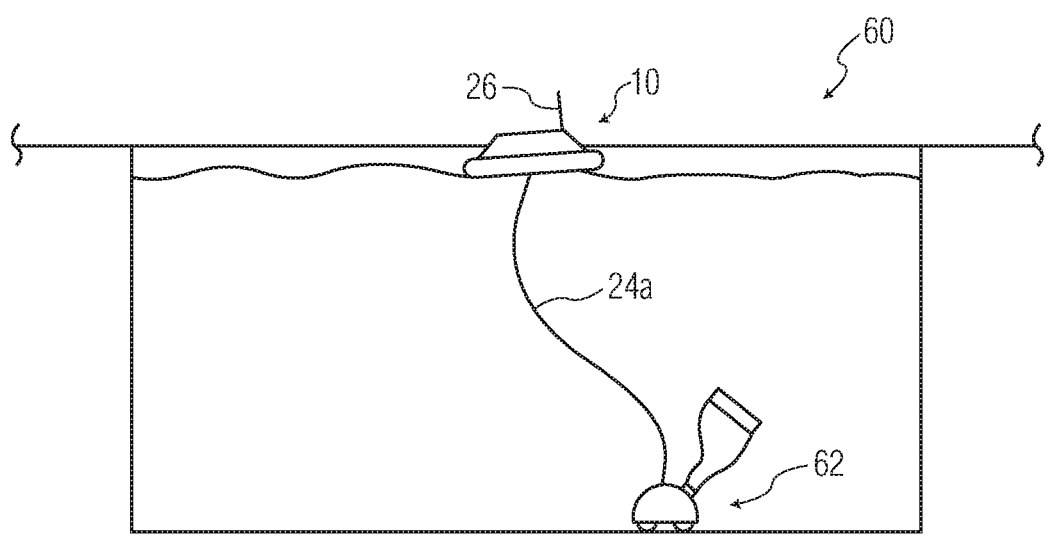
FIG. 5 is a diagram showing the floating power supply of the present invention, connected to an underwater electric pool cleaner.

FIG. 5 is a diagram showing the floating power supply 10 of the present invention, connected to an underwater electric pool cleaner 62. The power supply 10 provides electrical power to the underwater electric pool cleaner 62 via the power cable 24a, so that the cleaner 62 can be operated to clean a pool 60. Advantageously, since the power supply 10 floats within the pool 60 and can move with the pool cleaner 62 (being tethered to and "towed" by the pool cleaner 62 when it moves), there is no need to provide a power supply outside of the pool 60 for the pool cleaner or to drape a power cord outside of the pool 60. This reduces the risk that a person could trip on such objects near the side of the pool 60, and potentially fall into the pool 60. It is noted that the power supply 10 could be connected to other types of equipment, such as underwater decorative lighting, a decorative fountain, or other type of equipment, so as to provide electrical power to same. Also, it is noted that the pool cleaner 62 could include an onboard rechargeable battery, in which case the power supply 10 need not include such a battery and charges the rechargeable battery of the pool cleaner 62. The antenna 26 allows for remote, wireless command and control of the cleaner 62, e.g., by way of a handheld wireless remote control unit, a central pool/spa controller, a local area network, the Internet, etc.

It is noted that the floating power supply 10 can be easily disconnected from a pool cleaner by way of one or more plugs provided on the power cord 24a that connects the power supply 10 to the cleaner. This allows for easy removal and storage of the power supply 10.

Figure 6:
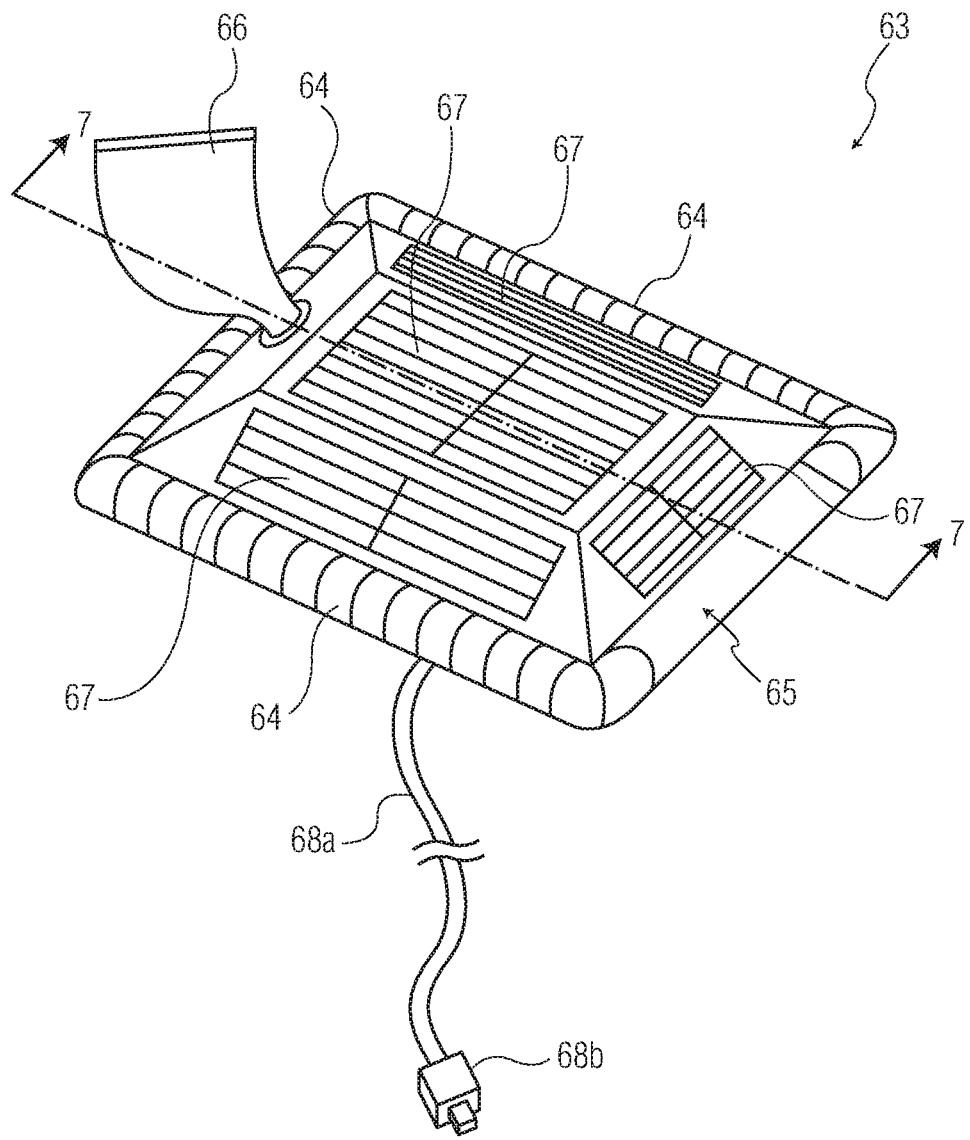
FIG. 6 is a perspective view of another embodiment of the floating power supply of the present invention which includes on-board surface skimming features.

FIG. 6 is a perspective view of another embodiment of the floating power supply of the present invention, indicated generally at 63. In this embodiment, the power supply 63 includes on-board surface skimming features that allow the power supply to clean ("skim") water in a pool or a spa, in addition to the power functions described above in connection with FIG. 1-5. Similar to the embodiment discussed above in connection with FIGS. 1-5, the power supply 63 includes a peripheral float 64 and a plurality of photovoltaic (solar) cells 67. A water inlet 65 is provided to allow for skimming of pool/spa water, and an internal pump and motor could be provided for powering skimming operations (discussed in greater detail below in connection with FIG. 7). An optional debris bag 66 could be provided for trapping skimmed surface debris, and could be removably coupled with the power supply 63 to permit easy removal of the bag to periodically clean same. Additionally, similar to the embodiments shown in FIGS. 1-5, a power cable 68a and associated plug 68b could be provided for connecting the power supply 63 to pool/spa equipment (e.g., a pool vacuum).

Figure 7:
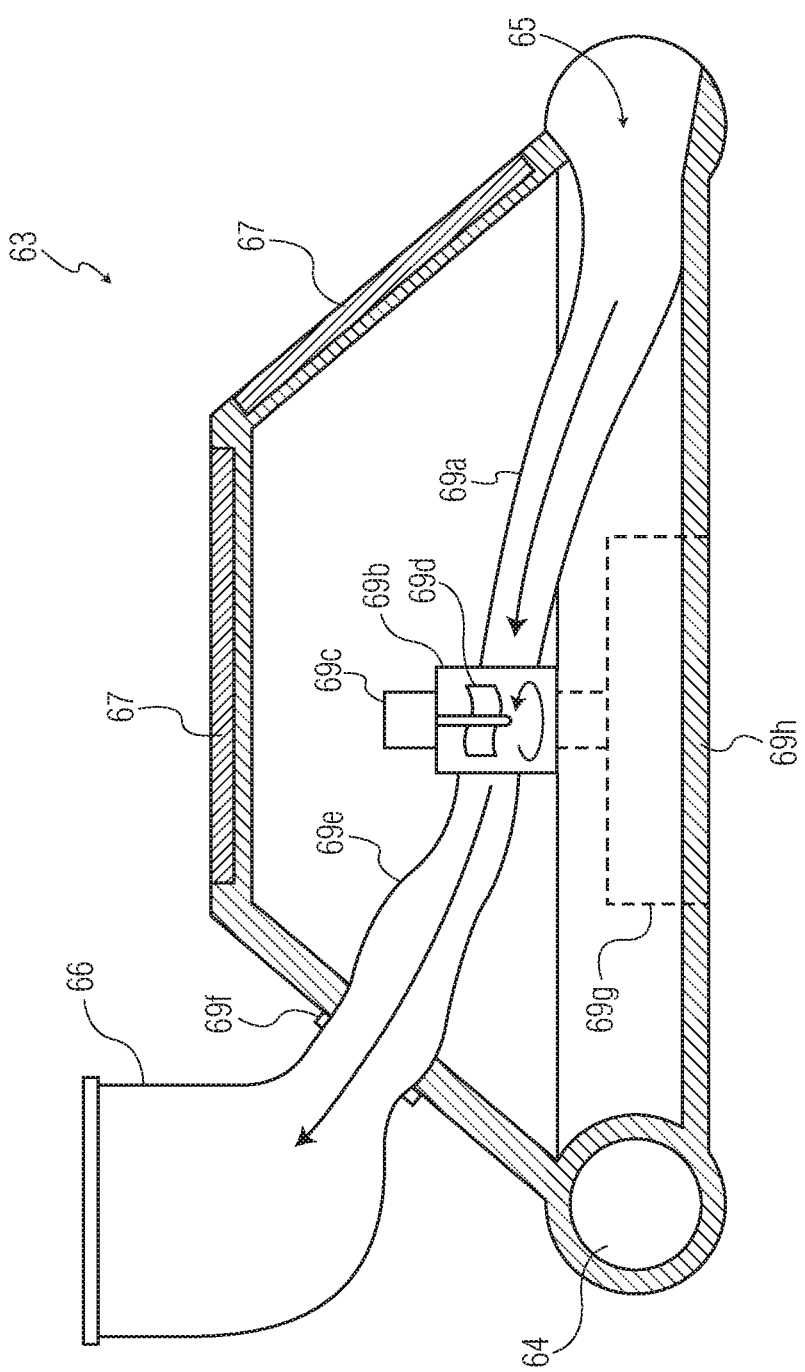
FIG. 7 is a partial cross-sectional view of the floating power supply shown in FIG. 6, taken along the line 7-7.

FIG. 7 is a partial sectional view of the power supply 63, taken along the line 7-7 of FIG. 6. As mentioned above, an on-board pump 69b could be provided to create suction for skimming operations, and for diverting skimmed surface debris into the debris bag 66. The pump 69b could include an electric motor 69c that powers an impeller 69d. The pump 69b could be connected to the water inlet 65 by a channel or flexible hose 69a, and could also be connected to a port 69f by a second channel or flexible hose 69e. The port 69f allows for removable coupling of the debris bag 66 to the power supply 63. Optionally, an on-board debris compartment 69g could be provided, thereby obviating the need for the bag 66. In such circumstances, the compartment 69g could be accessed by way of a door 69h provided on the power supply 63, to allow for periodic cleaning/emptying of the compartment 69g. It is noted that the motor 69c could be powered by the solar cells 67, and/or by an on-board battery provided in the power supply 63.

It also noted that the pump 69b and associated motor 69c need not be provided to perform skimming operations. For example, the water inlet 65 could be coupled directly to the debris bag 66 (e.g., by way of a channel or flexible hose). In such circumstances, if the power supply 63 is connected to a pool/spa vacuum via the cable 68a, it will be moved or "dragged" across the surface of the pool or spa as the vacuum moves. When this happens, debris if captured by the water inlet 65 and is channeled to the debris bag 66 by virtue of the physical movement of the power supply 63.

Figure 8:
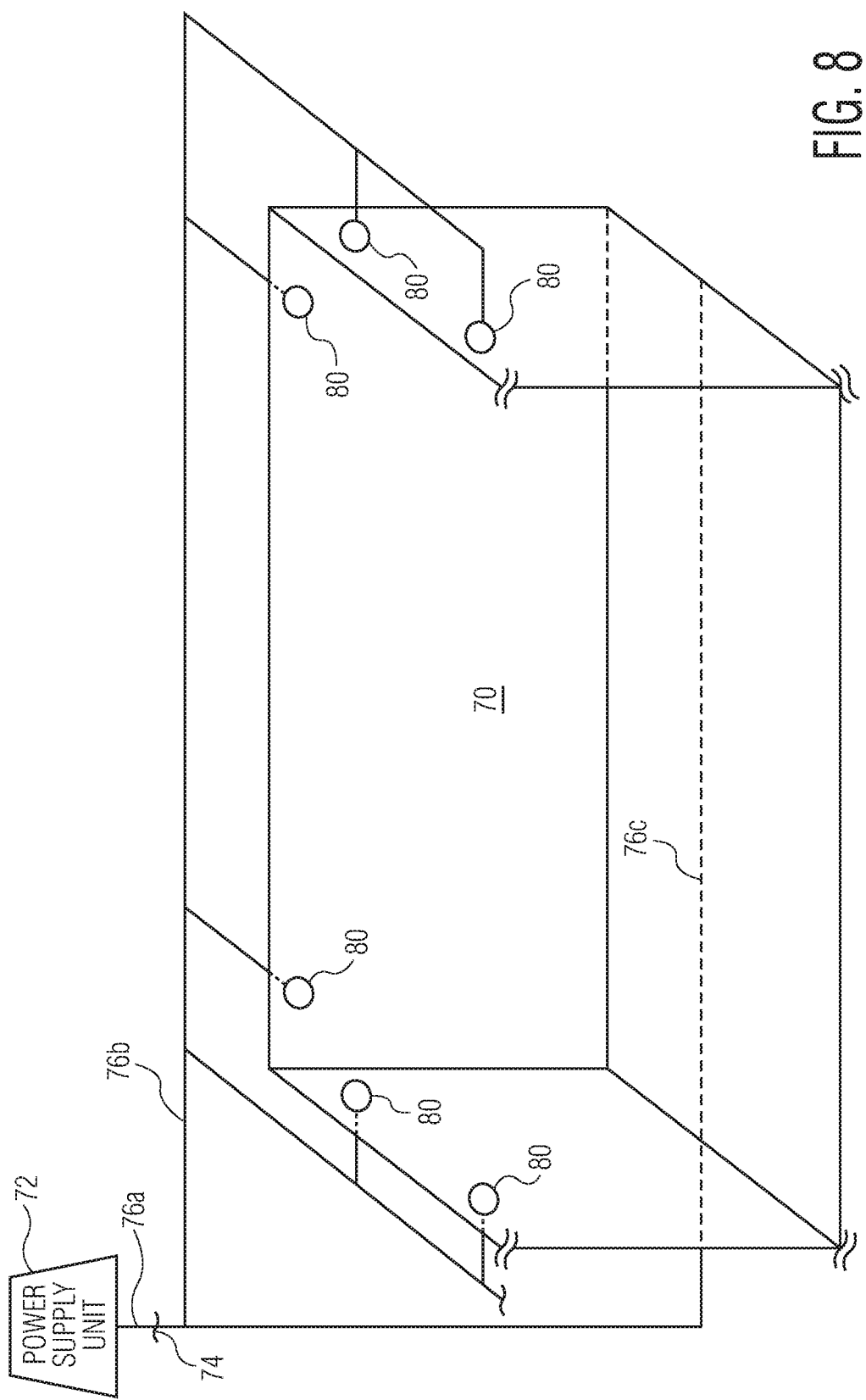
FIG. 8 is a perspective diagram showing inductive power couplings of the present invention connected to a power supply unit.

FIG. 8 is a diagram showing the power supply unit 72 of the present invention, connected to inductive power coupling couplings 80 installed in the walls of the pool 70. Of course, the couplings 80 could also be installed in the floor of the pool 70. The power supply unit 72 provides electrical power to the inductive power coupling couplings 80 via conduits 76a, 76b. The power supply conduit 76a connects to the power supply unit 72 and extends below ground 74. Below ground, the conduit 76b is positioned and connected to the inductive power coupling couplings 80, and, optionally, to a buried inductive power conduit and/or cable 76c. Inductive power coupling couplings 80 and inductive power conduit/cable 76c function allow for inductive transmission of electrical powered from the power supply 72 to an underwater device, such as an underwater pool/spa cleaner.

Figure 9A:
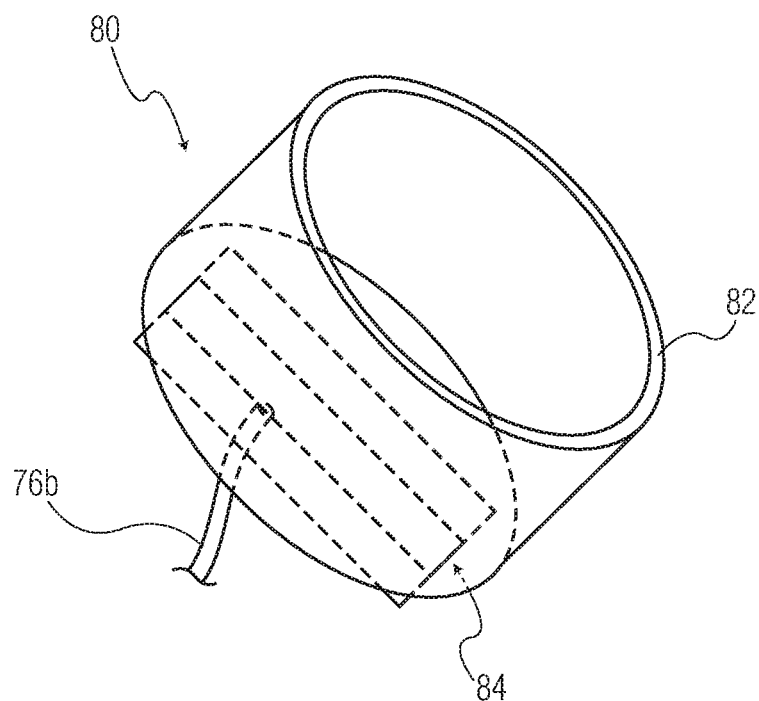
FIGS. 9A-9C are perspective, top, and side views, respectively, showing the inductive couplings of the present invention.
Figure 9B:
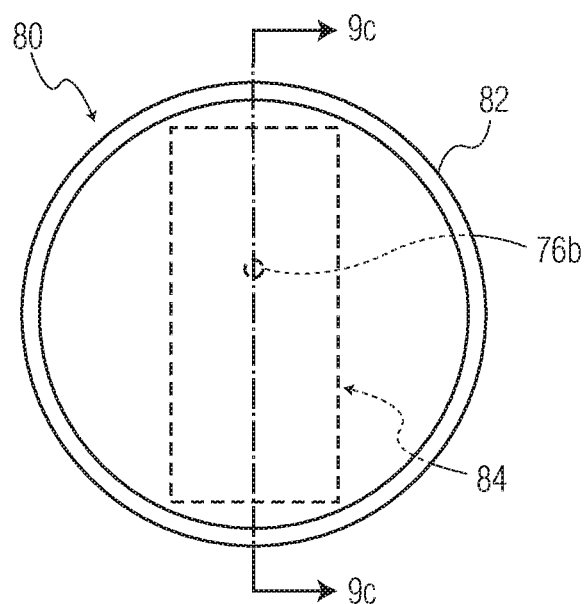
Figure 9C:
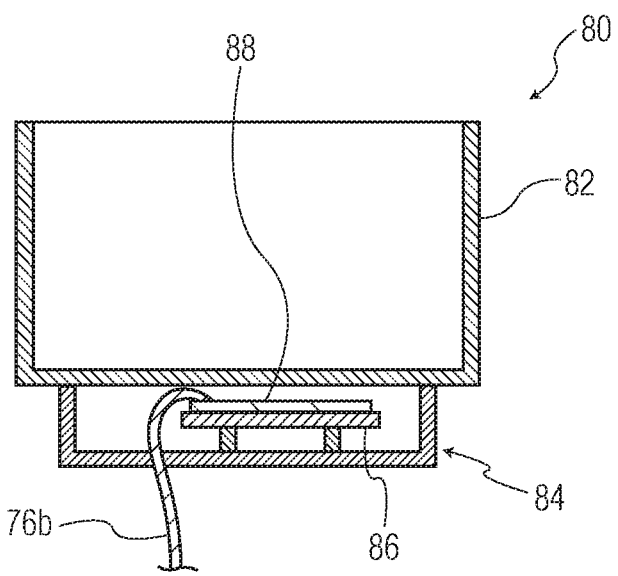

FIG. 9A-9C are perspective, top, and cross-sectional views, respectively, showing one embodiment of the inductive power coupling 80 of the present invention. The coupling 80 includes a housing 82 which is generally embedded in a pool or spa wall. The housing 82 defines a recess which receives a corresponding inductive power coupling from a pool or spa device, which will be described in greater detail below. The housing 82 could be made of a plastic material such as polyvinyl chloride (PVC) or any other sturdy waterproof material that does not interfere with electrical field transmission, and which is an electrical insulator. Of course, other materials could be utilized. Attached to the external surface of the rear wall of the housing 82 is circuitry housing 84. The circuitry housing 84 houses an inductor circuit 88 which allows for the inductive transmission of electrical power electrical power. The housing 82 defines a cavity allowing for the insertion of a complementary inductive coupler. Attached to the rear of the housing wall 82 is the circuitry housing 84. Enclosed within the circuitry housing 84 is a circuit board 86 which includes the inductor circuit 88. Providing power to the inductor circuit 88 is the power conduit 76b.

Figure 10A:
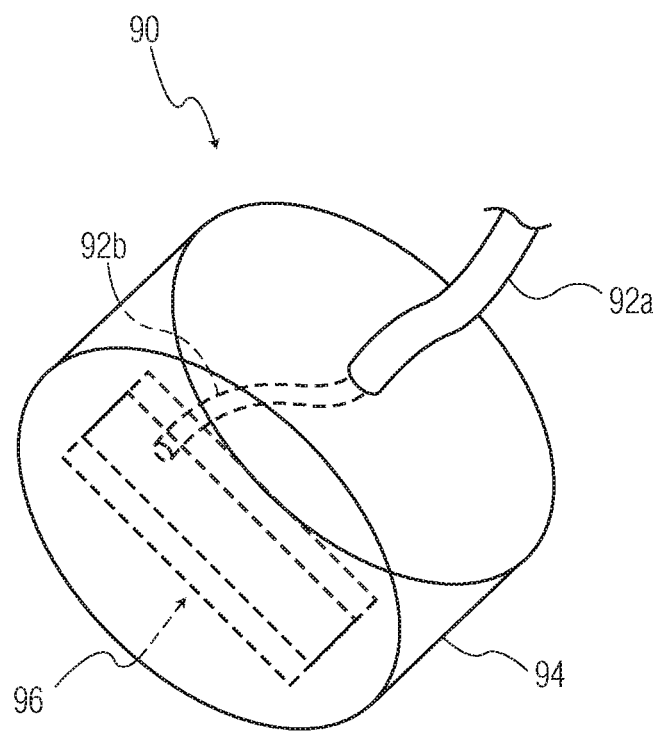
FIGS. 10A-10C are perspective, top, and cross-sectional views, respectively, of the complementary inductive couplings of the present invention.
Figure 10B:
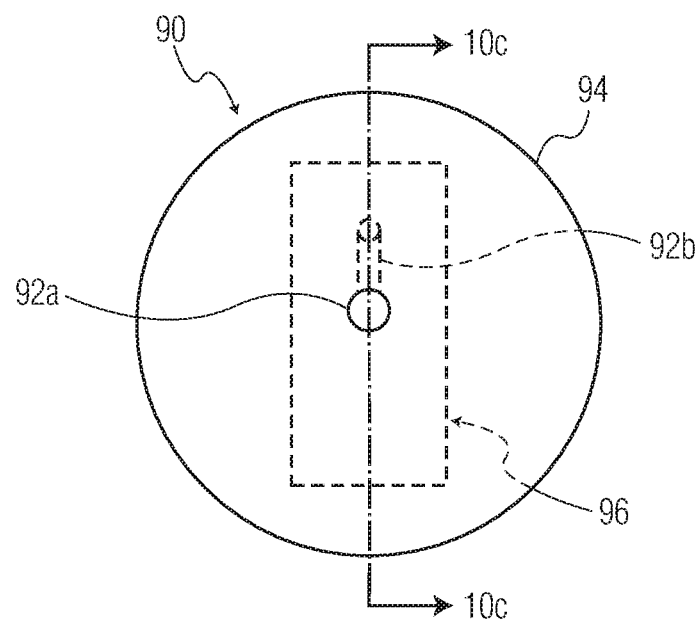
Figure 10C:
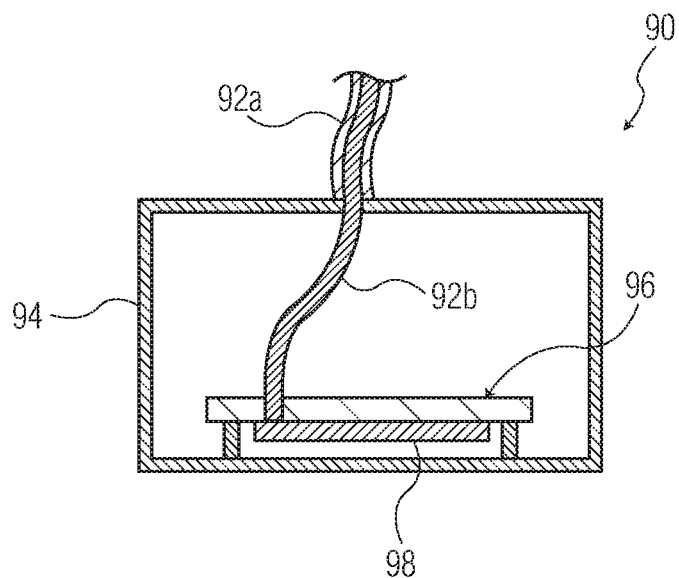

FIGS. 10A-10C are perspective, top, and cross-sectional views, respectively, of the complementary inductive coupler 90 of the present invention. The coupling 90 includes a housing 94 which is tethered to a pool or spa device such as a cleaner. The housing 94 could be made of a plastic material such as polyvinyl chloride (PVC) or any other sturdy, waterproof material that does not interfere with inductive power transmission. Attached to the inner surface of the front wall of the housing 94 is the circuitry housing 96. The circuitry housing 96 houses the inductor circuit 98 and allows for the power conduit 92b to supply the inductor circuit 98 with electrical power. Power cable 92b runs from the pool or spa apparatus, for example pool cleaner, to the inductor circuit 98. The cable 92b could be encased in a waterproof sheath 92a.

Figure 11A:
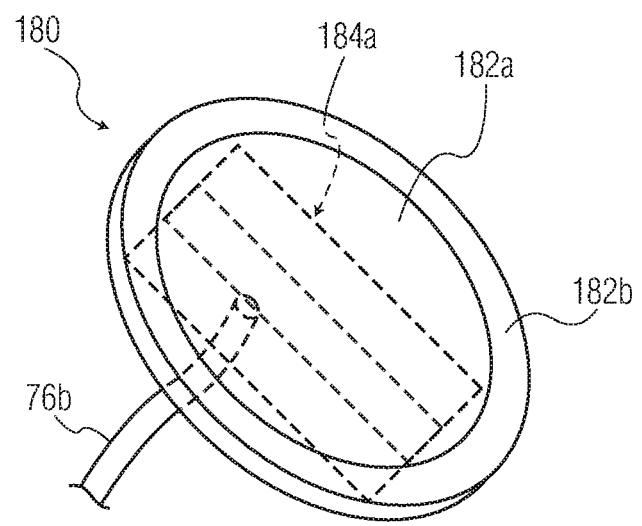
FIGS. 11A-11C are perspective, top, and cross-sectional views, respectively, of another embodiment of the inductive couplings of the present invention.
Figure 11B:
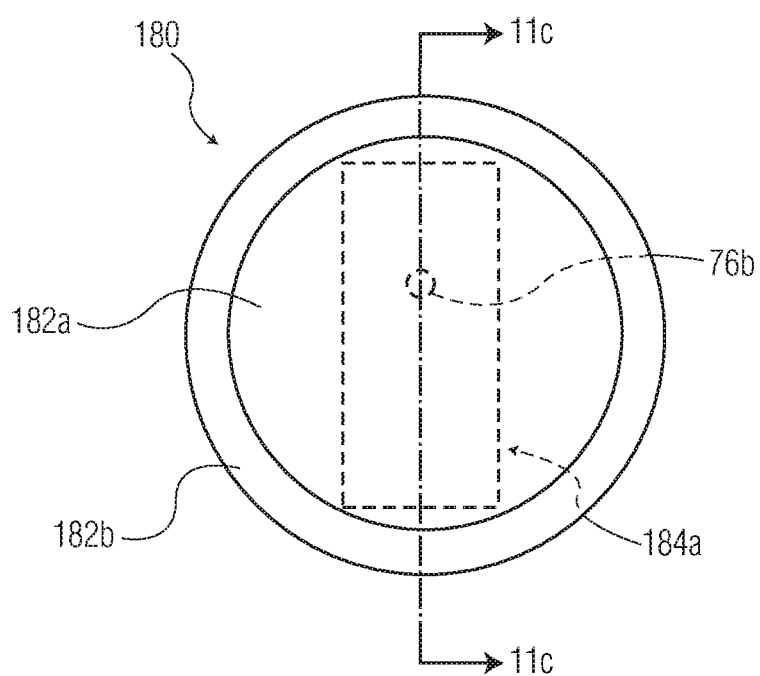
Figure 11C:
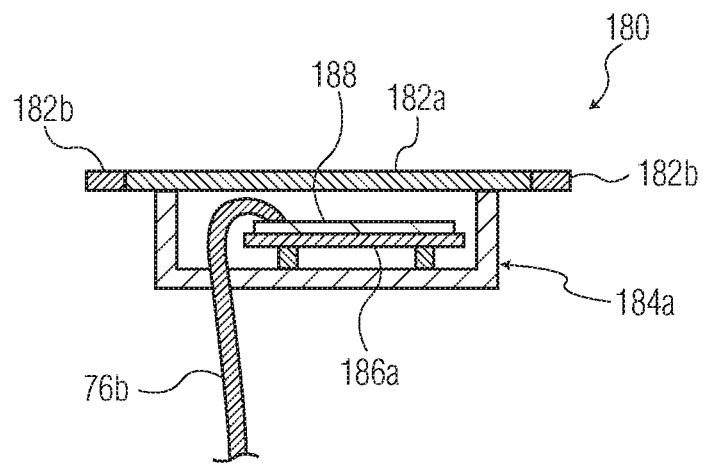

FIG. 11A-11C are perspective, top, and cross-sectional views, respectively, of another embodiment of the inductive coupling of the present invention, indicated at 180, wherein a flat coupling is provided. The coupling 180 comprises a flat plate 182a formed of a plastic material such as polyvinyl chloride (PVC) or any other sturdy waterproof material that does not interfere with inductive power transmission. Surrounding the periphery of the plate 182a is a magnetic ring 182b. Optionally, the ring 182b may be formed of a ferromagnetic metal. When installed, the plate 182a and magnetic ring 182b are generally bonded to a pool wall or positioned within a pool wall. Attached to the rear surface of the plate 182a is the circuitry housing 184a. The circuitry housing 184a houses the inductor circuit 188 and allows for the power conduit 76b to supply the inductor circuit 188 with electrical power. Enclosed within the circuitry housing 184a is a mounting board 186a which is attached to the inner surface of the circuitry housing 184a rear wall.

Figure 12A:
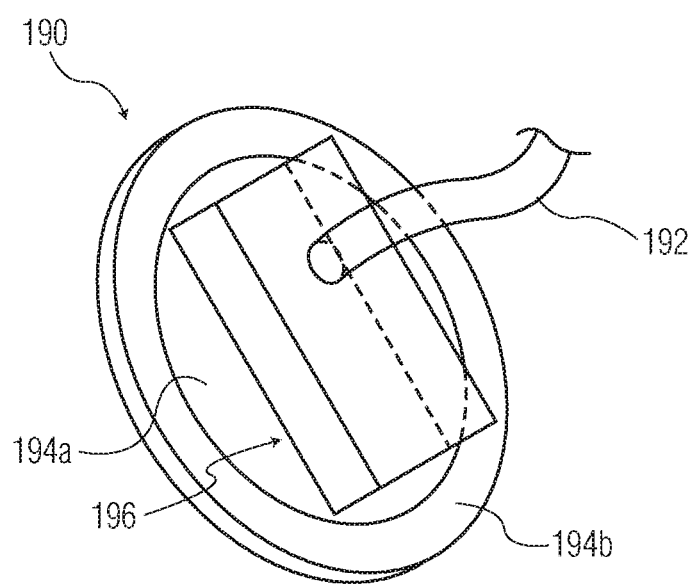
FIGS. 12A-12C are perspective and top views, respectively, of another embodiment of the complementary inductive power couplings of the present invention.
Figure 12B:
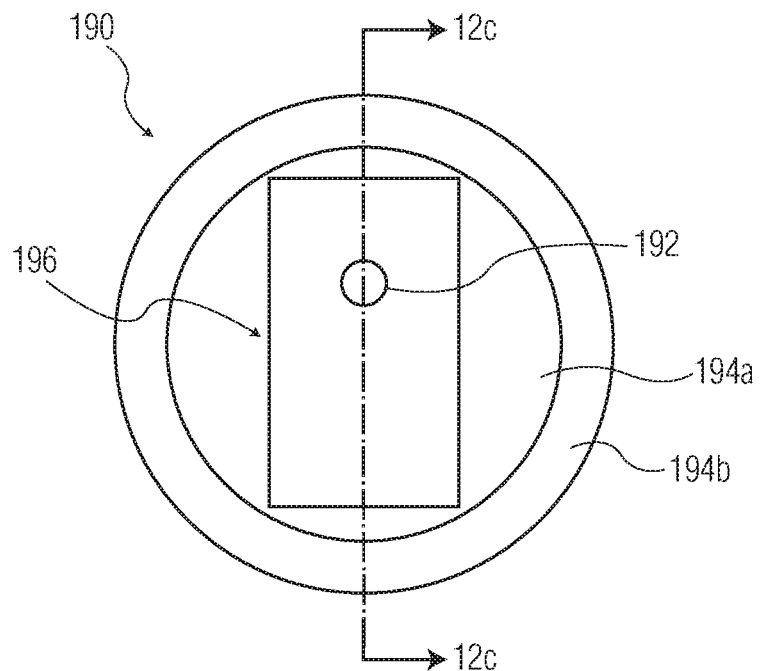
Figure 12C:
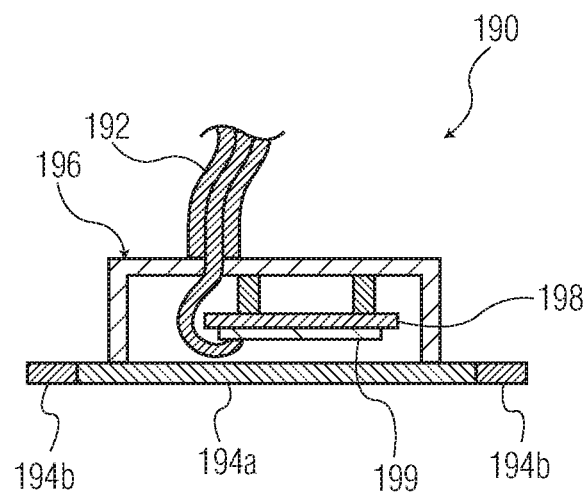

FIGS. 12A-12C are perspective, top, and cross-sectional views, respectively, of another embodiment of the complementary inductive coupling of the present invention, indicated generally at 190. The complementary coupling 190 is tethered to underwater pool/spa equipment, and mates with the coupling 180 of FIGS. 11A-11C. The coupling 190a includes a flat plate 194a formed of a plastic material such as polyvinyl chloride (PVC) or any other sturdy waterproof material that does not interfere with inductive power transmission. Surrounding the periphery of the plate 194a is a ferromagnetic metal ring 194b. Optionally, the ring 194b may be formed of a magnet. Attached to the rear surface of the plate 194a is the circuitry housing 196, which houses the inductor circuit 199 which is connected to a power cable 192 connected to underwater pool/spa equipment. The circuit 199 could be mounted to a mounting board 198, as shown.

Figure 13A:
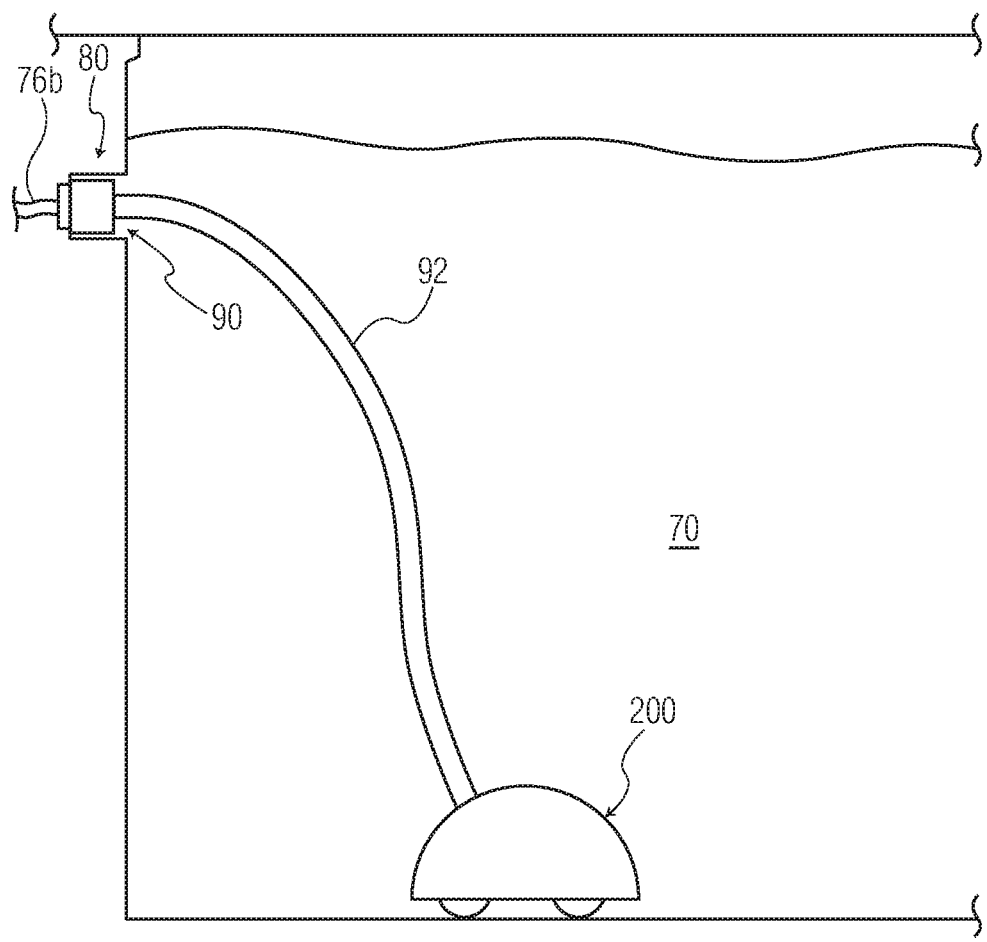
FIGS. 13A-13B are side views of the present invention showing mating of the inductive power couplers.
Figure 13B:
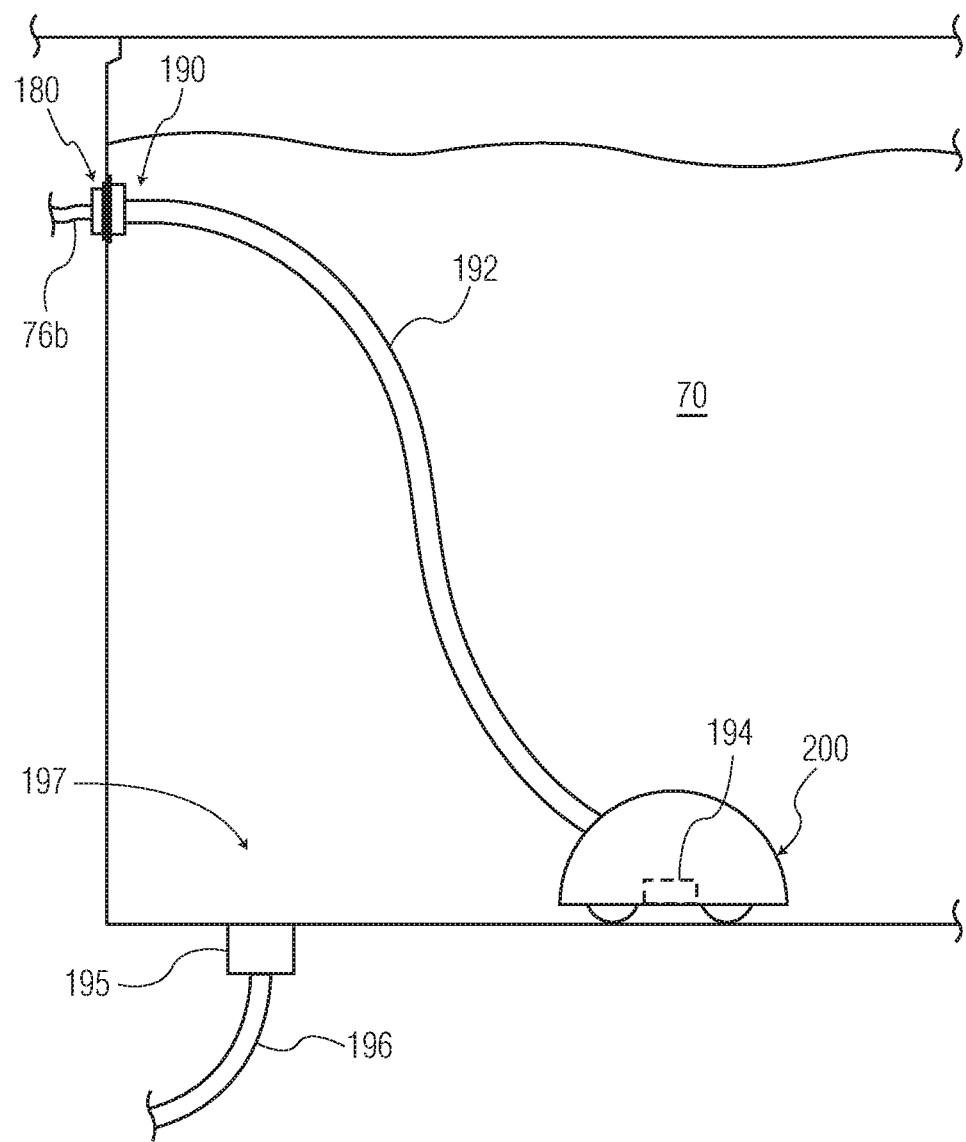

FIGS. 13A-13B are side views showing operation of the couplings 80, 90 and 180, 190, respectively. As can be seen, the couplings allow an underwater pool/spa device, such as an underwater electric pool/spa cleaner 200, to be removably connected to a power source. Advantageously, the couplings 80, 90 and 180, 190 allow for quick connection and disconnection, and due to their insulated nature, the risk of electric shock is obviated. Moreover, since the couplings have smooth surfaces, they are easy to clean.

Referring to FIG. 13B, it is noted that a docking area or "station" 197 could be provided in a pool or spa, to which area or station the pool/spa cleaner 200 automatically travels and docks to periodically recharge the on-board battery of the pool/spa cleaner. In such circumstances, the cable 192 need not be provided. Instead, an inductive coupling 195 is embedded in a surface of the pool or spa (e.g., in the floor of the pool as shown in FIG. 13b), and a corresponding inductive circuit 194 is provided on-board the cleaner 200. A power cable 196 provides electrical energy to the coupling 195. When the cleaner 200 detects a low battery condition (e.g., by way of built-in monitoring circuitry and/or logic), the cleaner 200 automatically navigates to the docking area 197, such that the inductive circuit 194 is positioned above the coupling 195 and electrical power is inductively transmitted from the coupling 195 to the circuit 194, and the battery is charged by such power. It is also noted that a recess could be provided in the wall of the pool or spa, the inductive coupler 195 could be positioned within the recess, and the cleaner 200 could navigate to and park itself in the recess to perform periodic charging operations.

Figure 14:
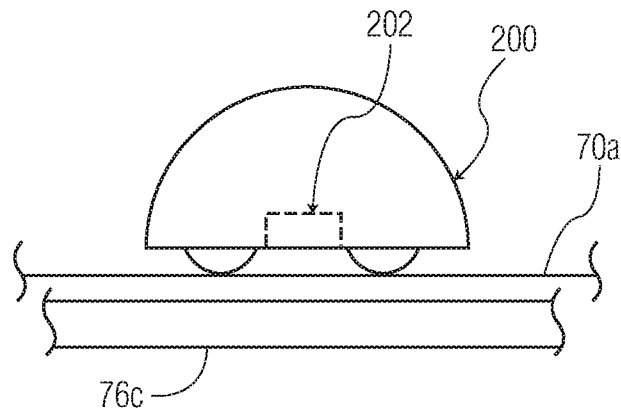
FIG. 14 is a side view showing the an underwater device being powered by the buried inductive power conduit or cable of the present invention.

FIG. 14 is a side view showing the pool cleaner 200 of FIGS. 13A-13B, wherein the pool cleaner 200 includes an on-board inductive circuit 202 which allows for inductive transmission of power from the buried inductive element 76c, e.g., conduit/cable, to the cleaner 200. As the cleaner 200 travels along the floor 70a of the pool, the inductive element 76 transmits electrical power to the circuit 202, to power the cleaner 200.

Figure 15:
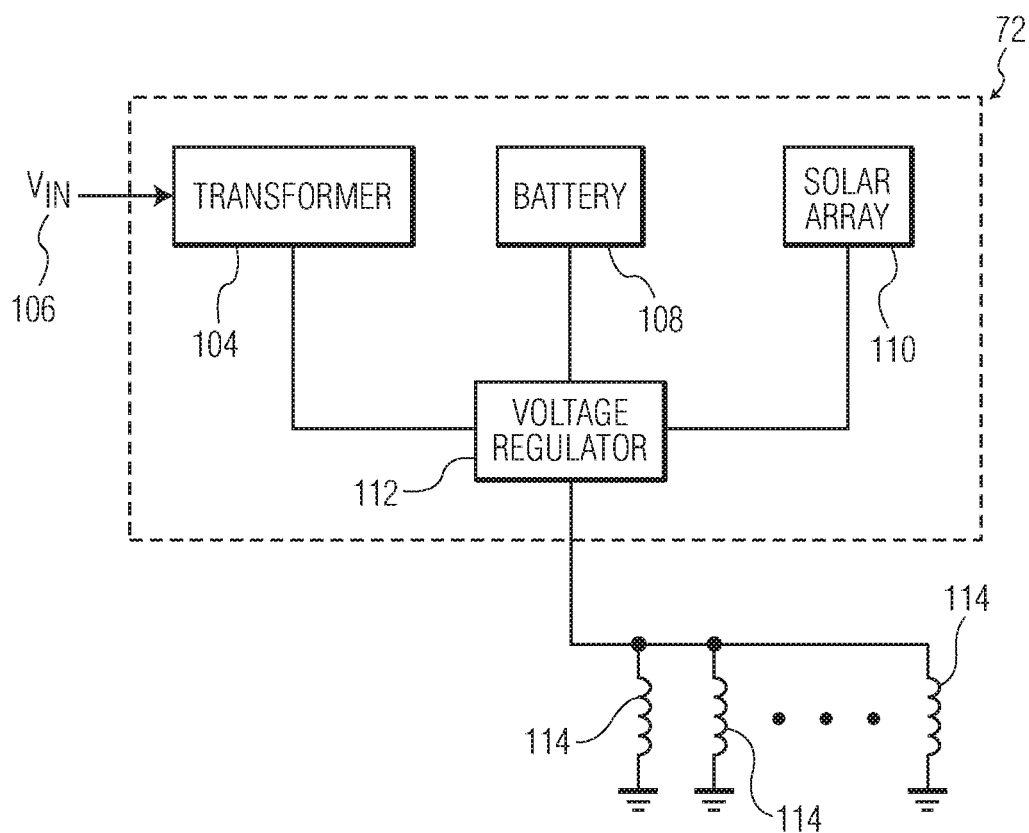
FIG. 15 is an electrical schematic diagram showing circuitry of the power supply unit of the present invention.

FIG. 15 is an electrical schematic diagram showing the power supply 72 in greater detail. The power supply 72 could step down an input voltage 106 via transformer 104 to provide power to inductors 114 (which could be positioned within the couplings 80, 90). Optionally, the transformer 104 could be a step-down transformer (e.g., 120 VAC to 12 VAC), and/or it could be an isolation transformer. Further, the power supply 72 could include a voltage regulator 112 for regulating voltage supplied to the inductors 114. Still further, the power supply 72 could be powered by an internal battery 108 (e.g., rechargeable nickel cadmium, nickel metal hydride, lithium ion, lithium polymer battery, etc.), and/or via a solar array 110, either (or both) of which could be connected to the inductors 114 via voltage regulator 112. The solar array 110 could charge the battery 108 in periods of sunlight.

Figure 16:
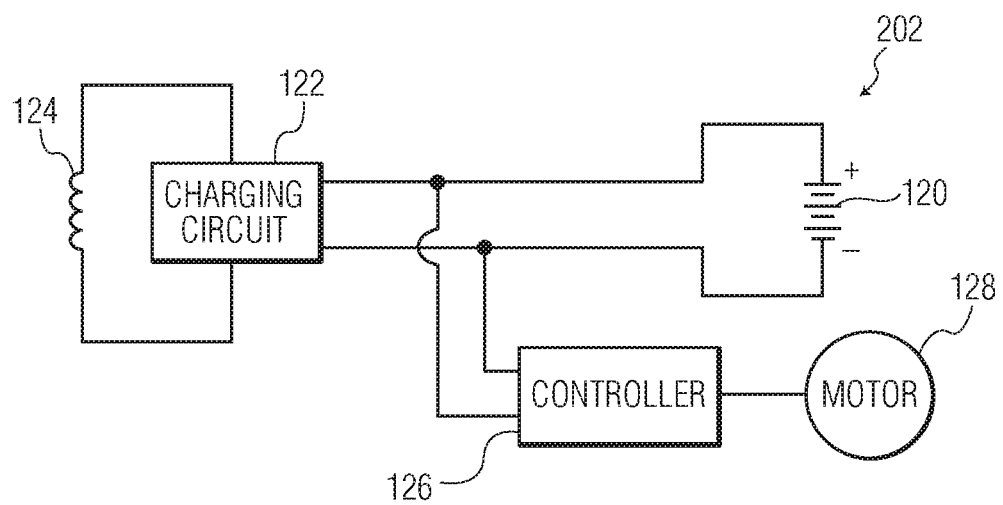
FIG. 16 is an electrical schematic diagram showing circuitry of an underwater pool cleaner which includes an inductive coupling in accordance with the present invention.

FIG. 16 is an electrical schematic diagram showing the inductive circuit 202 of the pool cleaner 200 in greater detail, for obtaining power from the buried conduit/cable 76c. An inductor 124 wirelessly receives power from the conduit/cable 76c, which could supply power to an optional charging circuit 122 for charging an on-board battery 120 of the cleaner 200. The inductor 124 could also power a controller 126 and a motor 128 of the cleaner 200. When the cleaner is not being used, it could be "parked" in proximity to the buried cable/conduit 76c, so that the inductor 124 wirelessly receives power from the cable/conduit 76c and charges the battery 120. When the battery 120 is charged, the cleaner 200 could operate at any location within the pool. Also, the controller 126 could include embedded logic which automatically detects when the battery 120 is low, and automatically navigates the cleaner 200 toward the conduit/cable 76c so that power is inductively obtained from the conduit/cable 76c to charge the battery 120.

Figure 17:
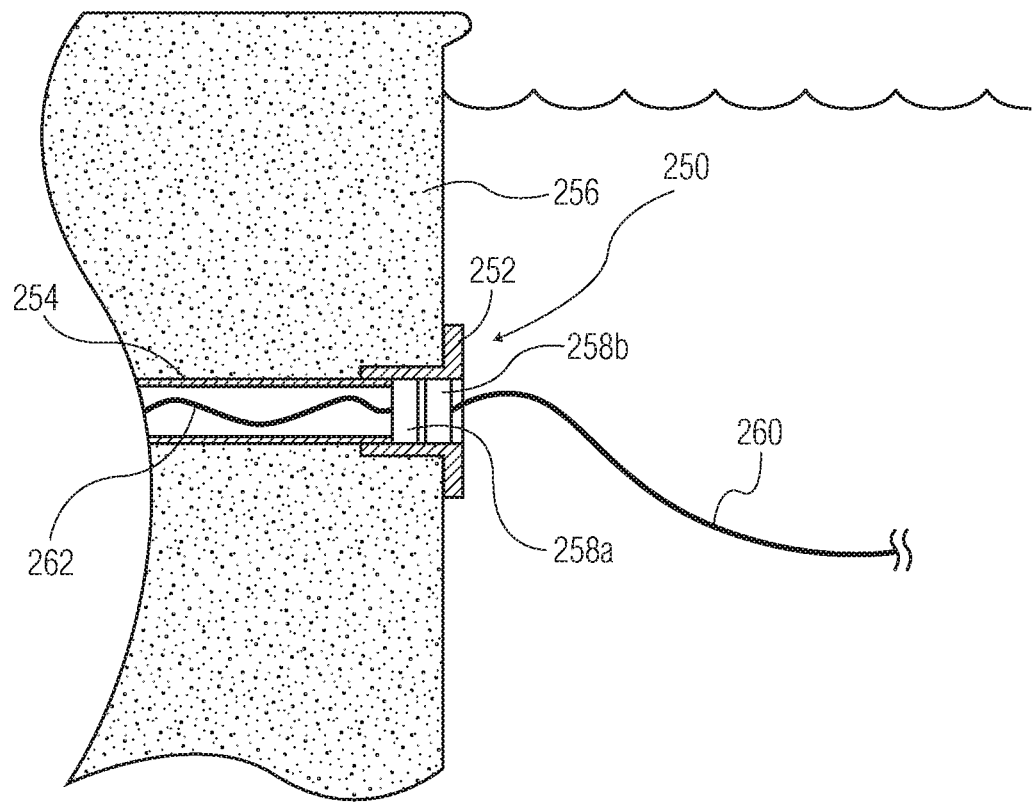
FIG. 17 is a partial sectional view of another embodiment of the present invention, showing an inductive power coupling provided in an existing plumbing fixture.

FIG. 17 is a partial sectional view of another embodiment of the present invention, indicated generally at 250, wherein inductive power couplings are provided in an existing plumbing fixture, e.g., suction port 252 and pipe 254, in a pool or spa 256. This arrangement is particularly advantageous as a "retrofit" solution for existing pools or spas. Conventional operation of the suction port 252 and pipe 254 can be disabled, and the port 252 and pipe 254 are instead used to deliver electrical power. As shown in FIG. 17, a first inductive coupling 258a is mounted within the suction port 252, and an electrical cable 262 is "pulled" through the pipe 254 and subsequently connected (e.g., at an equipment pad) to a power supply circuit (e.g., that steps power down from 120 volts A.C. to 12 volts A.C.). The coupling 258a could be retained in place by way of a friction fit, a snap fit, gluing, etc., or in any other suitable fashion. A corresponding inductive coupling 258b is sized and shaped to be removably received by the port 252, and electrical power is inductively transmitted from the coupling 258a to the coupling 258b when the coupling 258b is positioned within the port 252. A cable 260 connects the coupling 258b to pool/spa equipment (e.g., to a pool cleaner), and transfers electrical power to same. It is noted that the arrangement shown in FIG. 17 could also be applied to other types of outlets existing in a pool or spa, and operation of such outlets (including the suction port 252 and pipe 254) may be active and need not be disabled. In other words, the inductive couplings could be positioned within such outlets but need not form a seal, so that water can still flow around the couplings, thereby permitting normal operation of such outlets.

It is noted that the inductive power couplings discussed herein could be utilized to provide power to pool/spa equipment not only for powering operation of these devices, but also to charge any on-board batteries that may be provided in such devices. Further, the inductive power couplings could be configured so as to change voltage levels. For example, an inductive coupling embedded in a wall of a pool or a spa could receive electricity at a first voltage (e.g., 120 volts A.C.), and a corresponding coupling could deliver power to a device in a pool or a spa at a different voltage level (e.g., 12 volts A.C.). This could be achieved by different numbers of wire "turns" provided in the couplings, such that the two couplings, when positioned near each other, function as an electrical transformer.

Having thus described the invention in detail, it is to be understood that the foregoing description is not intended to limit the spirit or scope thereof.

What is claimed is:

1. A power supply for powering pool or spa equipment, comprising:
   a power supply unit external to a pool or a spa;
   a first inductive power coupling at the pool or spa and including an inductor circuit, said first inductive power coupling in electrical communication with the power supply unit;
   a second inductive power coupling including an inductor circuit, said second inductive power coupling positionable proximate to said first inductive power coupling, wherein the inductor circuit of the first power coupling inductively transmits power from the power supply unit to the inductor circuit of the second inductive power coupling for powering a device in a pool or spa connected to the second inductive power coupling; and
   a cable connected at a first end to the device and at a second end to the second inductive power coupling such that the second inductive power coupling is detached from the device, the cable delivering electrical power to the device and permitting movement of the device relative to said first and second inductive power couplings while said second inductive power coupling is positioned proximate to said first inductive power coupling.

2. The power supply of claim 1, wherein the first inductive power coupling includes a housing defining a cavity for receiving the second inductive power coupling.

3. The power supply of claim 2, wherein the second inductive power coupling is configured to be inserted into the housing of the first inductive power coupling.

4. The power supply of claim 1, wherein the first and second inductive power couplings are flat plates, each including means for releasably securing the inductive power couplings to each other.

5. The power supply of claim 4, wherein the means for releasably securing the inductive power couplings to each other are magnetic.

6. The power supply of claim 1, wherein the device is a pool cleaning device.

7. The power supply of claim 6, wherein the pool cleaning device includes a rechargeable battery rechargeable by the power supply unit.

8. The power supply of claim 1, wherein the power supply unit comprises one or more of an A/C power supply, a battery, or a solar array.

9. The power supply of claim 1, wherein the first and second inductive power couplings operate as a transformer for changing one voltage level to a different voltage level.

10. A power supply for powering pool or spa equipment, comprising:
    a power supply unit external to a pool or spa;
    a first inductive power coupling including an inductor circuit, said first inductive power coupling in electrical communication with the power supply unit and positionable in a pipe of a pool or a spa;
    a second inductive power coupling including an inductor circuit, said second inductive power coupling positionable proximate to said first inductive power coupling, wherein the inductor circuit of the first power coupling inductively transmits power from the power supply unit to the inductor circuit of the second inductive power coupling for powering a device in a pool or spa connected to the second inductive power coupling and
    a cable connected at a first end to the device and at a second end to the second inductive power coupling such that the second inductive power coupling is external to the device, the cable delivering electrical power to the device and permitting movement of the device relative to said first and second inductive power couplings while said second inductive power coupling is positioned proximate to said first inductive power coupling.

11. The power supply of claim 10, wherein the pipe includes a suction port.

12. The power supply of claim 11, wherein the second inductive power coupling is sized and shaped to be inserted into the suction port.

13. The power supply of claim 10, wherein the first inductive power coupling includes a housing defining a cavity for receiving the second inductive power coupling.

14. The power supply of claim 13, wherein the second inductive power coupling is configured to be inserted into the housing of the first inductive power coupling.

15. The power supply of claim 10, wherein the first and second inductive power couplings are flat plates, each including means for releasably securing the inductive power couplings to each other.

16. The power supply of claim 15, wherein the means for releasably securing the inductive power couplings to each other are magnetic.

17. The power supply of claim 10, wherein the device is a pool cleaning device.

18. The power supply of claim 17, wherein the pool cleaning device includes a rechargeable battery rechargeable by the power supply unit.

19. The power supply of claim 10, wherein the power supply unit comprises one or more of an A/C power supply, a battery, or a solar array.

20. The power supply of claim 10, wherein the first and second inductive power couplings operate as a transformer for changing one voltage level to a different voltage level.

* * * * *